United States Patent [19]

Ericsson

[11] Patent Number: 5,001,560
[45] Date of Patent: Mar. 19, 1991

[54] METHOD AND APPARATUS EMPLOYING ADAPTIVE FILTERING FOR EFFICIENTLY COMMUNICATING IMAGE SEQUENCES

[75] Inventor: Staffan Ericsson, Manchester, Mass.

[73] Assignee: PicTel Corporation, Peabody, Mass.

[21] Appl. No.: 289,375

[22] Filed: Dec. 23, 1988

Related U.S. Application Data

[63] Continuation of Ser. No. 175,661, Mar. 21, 1988, Pat. No. 4,794,455, which is a continuation of Ser. No. 1,145, Jan. 7, 1987, abandoned.

[51] Int. Cl.$^5$ ............................................. H04N 7/12
[52] U.S. Cl. .................................... 358/133; 352/135; 352/136
[58] Field of Search ............... 358/135, 136, 105, 133, 358/141

[56] References Cited

U.S. PATENT DOCUMENTS

4,628,344 12/1986 Glenn .................................. 358/133
4,692,801 9/1987 Ninomiya et al. ............... 358/135 X
4,811,092 3/1989 Achiha et al. ....................... 358/105
4,858,026 8/1989 Richards ............................ 358/135

Primary Examiner—James J. Groody
Assistant Examiner—Victor R. Kostak
Attorney, Agent, or Firm—Hale and Dorr

[57] ABSTRACT

A method and apparatus for decoding and receiving a sequence of image frames employ selectively a measure of motion displacement for generating a motion compensated image and filter selection data. The motion compensated image, together with an error signal, provides the receiver with full detail regarding the next frame of a sequence. In some instances, however, the motion displacement data is inaccurate for portions of the next image frame. In those instances, the method and apparatus determine from the filter selection data that filtering of a portion of a previously received image provides a lower error energy for the resulting prediction of the image. If a lower error energy is not achieved by low-pass filtering, the data from the communications path regarding the motion displacement enables the receiver to reconstruct at least a block portion of the image frame.

7 Claims, 7 Drawing Sheets

METHOD AND APPARATUS EMPLOYING ADAPTIVE FILTERING FOR EFFICIENTLY COMMUNICATING IMAGE SEQUENCES

This is a continuation of my earlier filed U.S. patent application Ser. No. 175,661, now U.S. Pat. No. 4,974,455 filed Mar. 21, 1988, now U.S. Pat. No. 4,974,455 which is a continuation of U.S. Ser. No. 001,145, filed Jan. 7, 1987, now abandoned

BACKGROUND OF THE INVENTION

The invention relates generally to data communication and signal processing methods and apparatus, and in particular to a method and apparatus for reliably and efficiently communicating sequences of image data over a communications channel, for example, a 56 kilobit per second telephone communications channel.

The transmission of sequences of images, and in particular sequences of naturally occurring images such as those represented by a television signal, has been the subject of a significant amount of investigation. Typically, investigators have relied upon the highly redundant nature of successive images in the sequence and have often modeled the image data as a Markov process with a correlation coefficient close to unity. The three-dimensional Markov model provides a motivation for utilizing differential pulse-code-modulation (DPCM) and transform coding techniques to take account of the interframe redundancy.

By analyzing the nature of typical moving video, it is easy to become convinced that the principal change occurring between successive frames is the inhomogeneous motion of the objects within the frame. It has also been recognized that an accurate apparatus and method of estimating and compensating for this spatially dependent motion enables the construction of an interframe data compression method and apparatus which can have substantially better performance than can be achieved by sending a signal representative merely of the difference between successive frames.

As a result, various motion compensating coding methods and apparatus have been developed. These systems typically are either receiver-based motion compensation systems or transmitter-based motion compensation systems. In the receiver-based motion compensation system, the receiver makes a prediction as to the motion and compensates the previous frame for the expected motion. The transmitter, operating in the same manner, then sends only an error signal describing what must be done at the receiver in order to correct the receiver predicted frame. The error signal is typically coded in order to reduce its bandwidth.

For a transmitter-based motion compensation system, the motion estimation process occurs only at the transmitter. Displacement vectors are generally determined over various regions of the image and this data is then transmitted to the receiver along with an error information data signal. At the receiver the compensation process is performed on the previously coded image first using the motion information provided by the transmitter. The error signal data provided by the transmitter is then added to the thus compensated receiver image in order to maintain picture quality.

A particularly advantageous and efficient transmitter-based motion compensation system is described in co-pending applications U.S. Ser. Nos. 740,897, 740,898, and 740,900, all in the name of Brian L. Hinman, assigned to the assignee of this application, and incorporated herein, in their entirety, by reference. The transmitter-based motion compensation system described there, while performing exceedingly well, encodes the motion compensation signals using a lossy compression encoder and hence can introduce artifacts which are not in the original image. Accordingly, the resulting receiver reconstructed image can be degraded somewhat.

The motion compensation process can provide a bad prediction of the new image for several other reasons. For example, the new image frame may not be able to be described by data which details displacements of the previous image; or there may be newly exposed areas of the image, a deformation of the image objects of the old image, illumination changes, or reflections in the image objects.

In addition, the error estimation procedure may fail to track the motion in the old image; the motion estimate may be applied to a region with non-uniform motion, that is, rotation; and coarse quantization can introduce noise into the previous frame that has been used for the prediction. Thus, if the motion compensated data predictions are used in areas of the image where it performs poorly, artifacts will appear in the receiver reconstructed image, especially at high compression rates. Image detail from the previous image will generate noise in the new image. It is to this problem, wherein a prediction performs poorly, that the present invention is directed.

It is therefore an object of the present invention to transmit sequences of images over a communications channel using relatively low bandwidth, and providing high reliability and fidelity. Other objects of the invention are a motion compensation method and apparatus which reliably provide either an accurate estimate of the displacement of the pixels of a scanned image in a sequence or an alternative compensation function, and an improved motion estimation method and apparatus which enable real-time, reliable, and accurate determination of each new image in an image transmission device.

SUMMARY OF THE INVENTION

The invention relates to a method and apparatus for decoding and receiving an encoded sequence of image frames, preferably in connection with a motion compensation image system. The method features receiving filter selection data from a communications path for determining the data source for reconstructing a next block of an image frame at the receiver. In one uncoded mode of operation, a low-pass image is derived from a previously received image frame, while in a second coded mode of operation, image data from the communications path, typically representing displacement data, is used for reconstructing the image frame. Typically, the method employs in connection with the low-pass image, applying a block averaging filter process at each picture element of the block of the image frame to be generated.

The receiver apparatus of the invention features circuitry for receiving the filter selection data from a communications channel for determining, for a block of the image frame being received, whether to employ a low-pass filter in connection with reconstructing the block of the image or whether to employ circuitry which derives the block being constructed in accordance with motion displacement information from the data channel.

BRIEF DESCRIPTION OF THE DRAWINGS

Other objects, features, and advantages of the invention will appear from the following description of particular preferred embodiments taken together with the drawings in which.

DESCRIPTION OF PARTICULAR PREFERRED EMBODIMENTS

Figure 1:
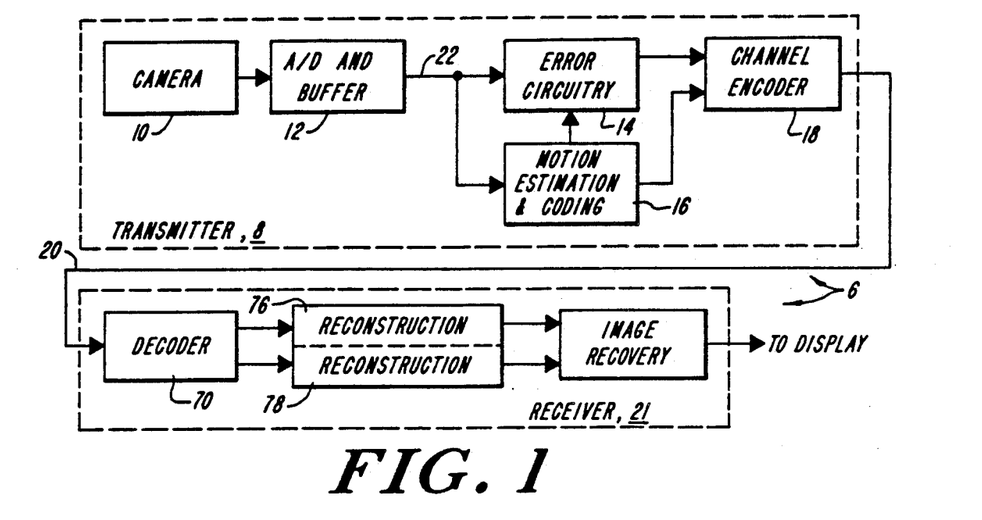
FIG. 1 is an electrical block diagram of a typical image communications system in accordance with the claimed invention.

Referring to FIG. 1, a communications system 6 has a transmitter 8 which, in accordance with a preferred embodiment of the invention, has a camera 10 for providing a video signal to an analog-to-digital converter and frame buffer 12. The frame buffer portion of the analog-to-digital converter and frame buffer 12 is capable of storing a full frame of the video, sampled to, for example, eight bits across a 256×240 pixel raster.

The entire coding and motion compensation process takes place in the digital domain. The transmitter has an error signal circuitry 14 and a motion estimation and coding circuitry 16. A channel encoder 18 codes the outputs of the error circuitry 14 and motion estimation and coding circuitry 16 and passes the thus encoded data onto a channel 20 for transmission to a receiver 21.

Figure 2:
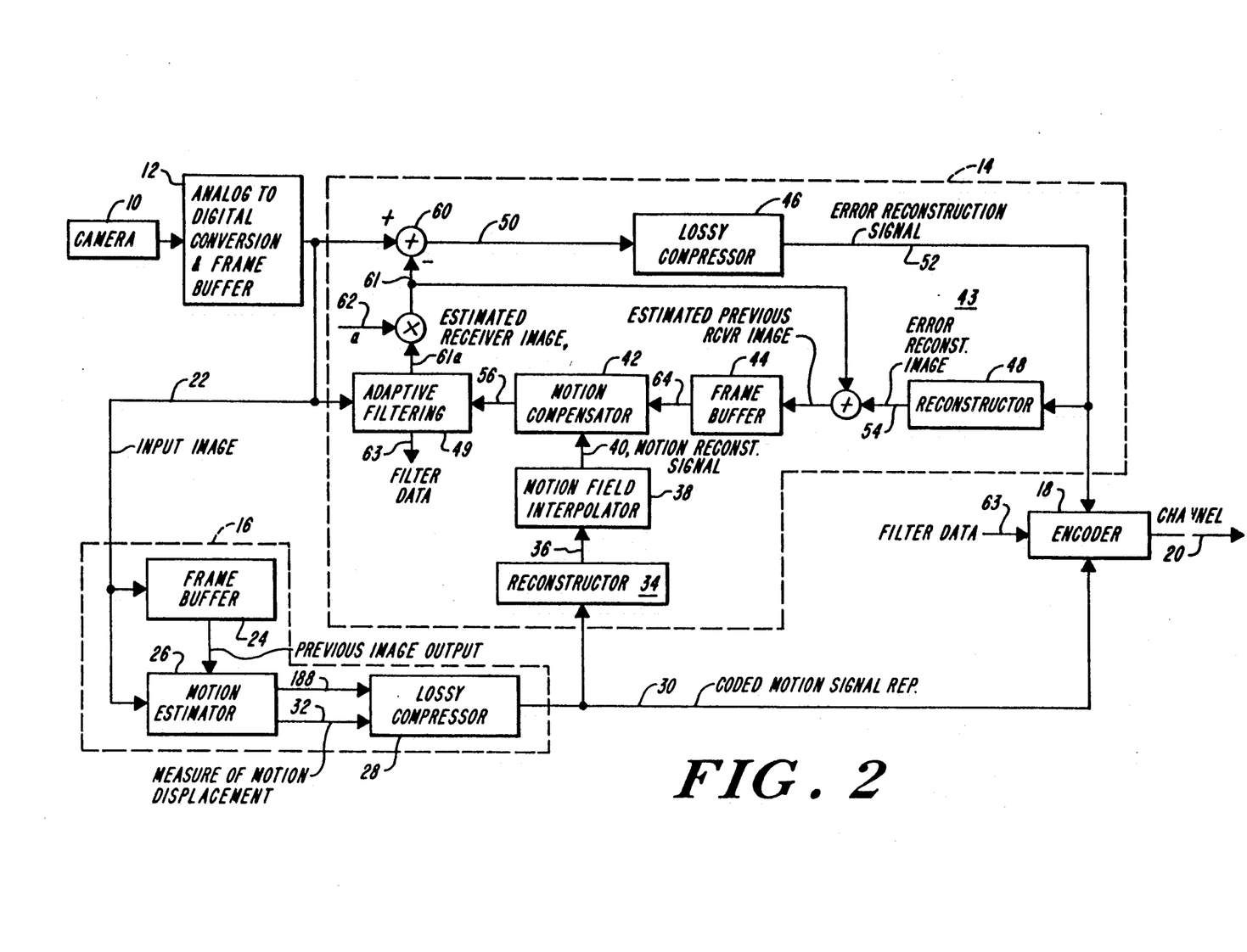
FIG. 2 is an electrical block diagram of the transmitter of a motion-compensated image encoding apparatus employing adaptive filtering in accordance with the invention.

The illustrated motion estimation and coding circuitry 16 of FIG. 1, in accordance with a preferred embodiment of the invention, and referring to FIG. 2, compares a present original input frame image, available over lines 22, with the previous original input image, available in this illustrated embodiment from a frame buffer 24. A motion estimator circuitry 26 generates a measure of the motion displacement between the frames input thereto, and can be any of a number of motion estimation devices as are well known in the art. In a preferred embodiment to be described hereinafter, the motion estimation device uses an adaptive steepest descent error minimization method to generate the motion displacement measures.

The output of the motion estimator 26 is a field of motion vectors which, as noted above, provide a measure of the motion displacement between input frames. This vector field provides a description of how to map a previous input frame or input image from buffer 24 into the best approximation of the present input frame or image over lines 22. By "best" is meant an error metric such as, for example, a mean-squared-error error measure. Typically, the motion estimator uses a region matching technique between non-overlapping blocks of the previous and present input images. Should motion occur for a region in the previous image, the estimator will determine which block in the present image is the best match for the block in the previous image, and the value of the displacement is the difference between a new coordinate pair for the block in the present image and the original coordinate pair for the block in the earlier image. That determination defines the motion vector to be associated with the block in the previous image.

Since scenes are generally composed of several large objects moving uniformly over time, there is a high degree of correlation in the motion vector field. To avoid transmitting redundant information, and to reduce the data bit requirements, the preferred embodiment of the invention modifies the motion vector field, thereby losing some information, to facilitate the compression of the motion representing data. In the illustrated embodiment, this operation is represented by a "lossy compressor" 28 which reduces the amount of data, and hence the bandwidth, required to represent the motion vector field. Noting the similarity between motion vector field and natural images, predictive, transform, or interpolative coding of the two independent components of the vector field can be employed by the lossy compressor 28.

Thus the lossy compressor circuitry 28 is employed for coding the motion vector field available over lines 32, and provides, over lines 30, a coded motion signal representative of the motion vectors. This output of the lossy compressor, as noted above, will not, upon decoding, exactly reproduce the signals over lines 32 (which provide the measure of motion displacement) and, therefore, have some error signal associated with them. Nevertheless, the reduction in the data requirements of a lossy compressor, when compared to, for example, a PCM exact coding method, are so substantial, that the use of a lossy compressor, is a significant advance in the art. One preferred lossy compression circuitry employs a discrete cosine transform and the circuitry incorporates a processing method described in co-pending application, U.S. Ser. No. 740,806, entitled Method and System for Adapting a Digitized Signal processing System for Block Processing With Minimal Blocking Artifacts and filed on June 3, 1985. The inventor is Henrique Malvar. That application, assigned to the assignee of the present application, is incorporated herein, in its entirety, by reference.

The output of the lossy compressor circuitry over lines 30, as noted above, is passed to the encoder 18. In addition, those signals are employed by the error circuitry 14 for determining what the receiver would have seen, absent any errors in the channel, and thereby providing the mechanism for determining the prediction error signal, that is, the signal representing the difference between what the receiver would have predicted based upon the coded motion signal representation over lines 30, and the true image input.

The output of the lossy compressor over lines 30 is used by a reconstructor circuitry 34 for producing, at its output, a signal representative of the measure of motion displacement, the motion vectors, on lines 32. The difference between the signals over lines 36, the output of the reconstruction circuitry, and the signals over lines 32, represents the coding error introduced by the lossy compression apparatus 28. The output of the reconstruction apparatus 34, over lines 36, is directed to a motion field interpolation circuitry 38 which operates in the spatial domain to associate with each picture element a motion displacement vector. Thus, while the input signals over lines 36 represent motion displacements for groups or regions of elements, for example, the picture elements of a 4×4 block, the motion field interpolator, as described in more detail below, resolves that data so that there is associated with each picture element, a motion displacement vector. The resulting output of the motion field interpolator, over lines 40, is designated the motion reconstruction signal.

The motion reconstruction signal is applied to a motion compensation apparatus 42 which forms part of an error reconstruction loop 43. The error reconstruction loop includes a frame buffer 44, a lossy compression circuitry 46, a reconstruction circuitry 48, and a selectively operable adaptive filter 49. The input to the lossy compression circuitry 46, over lines 50, is the error signal which is to be transmitted to the receiver. That error signal is coded to reduce its bandwidth and the resulting signal, the error reconstruction signal over lines 52, is delivered to the channel encoder 18. The lossy compressor 46 can be any of the two-dimensional block encoders such as a transform or DPCM encoder, and is preferably the encoder described in Malvar's co-pending application Ser. No. 740,806, referred to above. The error reconstruction signal is also sent to the reconstruction apparatus 48 which provides the inverse operation of the lossy compressor 46. There results, therefore, at the output of the reconstruction apparatus 48, an error reconstruction image over lines 54. The error reconstruction image is added to the expected output of the motion compensator, (which is the estimated receiver image over lines 61) and the resulting signal, an estimated previous receiver image (the predicted receiver image for the previous frame), is stored in the frame buffer 44.

The estimated receiver image is also applied to a differencing apparatus 60 which takes the difference between what the receiver is expected to predict, the signal over lines 61, and the actual image available from A-D converter and frame buffer 12. The output of the differencing apparatus 60 is the error signal input to the lossy compressor 46 over lines 50. If desired, a "leak" constant, "a", can be used to multiply the output of the adaptive filter 49 over lines 61a by a factor less than or equal to 1. This factor, "a," 60 is indicated at 62 and provides for gradually eliminating the effect of errors in the channel.

The output of motion compensator 42 represents the predicted receiver image as a result of reconstructing the output data from lossy compressor 28. For those blocks wherein the motion compensation data is accurate, the signal over lines 56 is applied directly, by the adaptive filter 49, to its output over lines 61a. For those blocks for which motion compensation is not adequate, as described in more detail below, the adaptive filter can, in effect, low-pass filter the output data over lines 56 and provides over lines 61a, for those regions wherein filtering is advantageous, a low-pass version of the motion compensation reconstructed receiver image. In addition, the adaptive filter provides filter data, over lines 63, to the channel encoder for transmission to the receiver.

As noted above, the input to the frame buffer 44 is the estimated previous receiver image. This receiver image, which takes into account all data received by the receiver, corresponds to the reconstructed receiver image for a frame. The image output from the frame buffer over lines 64 is the image which the motion compensation circuitry 42 modifies in accordance with the output of the motion field interpolator 38 over lines 40.

Figure 3:
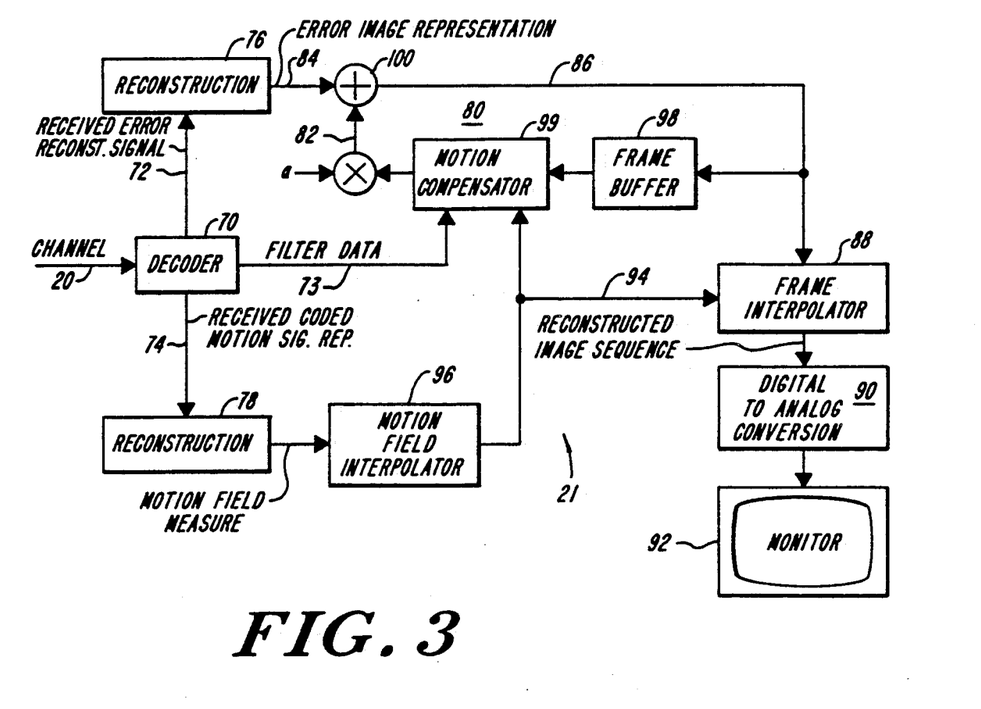
FIG. 3 is an electrical block diagram of the receiver of a motion-compensated image coding system employing adaptive filtering for receiving the channel signals from the transmitter of FIG. 2.

At the receiver 21, referring to FIG. 3, the data from the channel is decoded by a channel decoder circuitry 70 and the resulting receiver error reconstruction signal over lines 72 and filter data signal over lines 73, and receiver coded motion signal representation over lines 74 are delivered to reconstruction circuitry 76, motion compensator 99, and reconstruction circuitry 78 respectively. The output of the error reconstruction circuitry 76 is delivered to a recovery loop 80 in which motion compensating signals over lines 82 are added to the error image representation over lines 84 to produce a reconstructed receiver signal over lines 86. That signal is delivered to a temporal frame interpolator 88, which can add one or more frames between the successive received frames over lines 86, for delivery to a digital-to-analog circuitry 90 and from there to a monitor 92 for viewing.

The frame interpolator 88 interpolates in the temporal domain in accordance with motion reconstruction signals received over lines 94. Those signals are generated by a motion field interpolator 96 corresponding to the motion field interpolator 38 of the FIG. 2. That motion field interpolator, as noted above, provides a motion vector for each picture element of the image and hence allows the frame interpolator to accurately predict what the image would have been at any selected time between received frames. The reconstructed receiver images over lines 86 are successively stored in a frame buffer 98 and are delivered to a motion compensator 99 which also receives signals from the motion field interpolator 96. The motion compensator 99 includes circuitry for adaptively filtering the input from buffer 98. The output of the motion compensator, representing the expected receiver image in the absence of an error correction, corresponds to the signal over lines 61a in the transmitter, and is delivered to the adder 100 for combination with the output of the error reconstruction circuitry over lines 84. As before, the output of the motion compensator circuitry can be modified by a "leak" parameter, "a," whereby the effects of errors in the channel can be slowly eliminated. (The "leak" parameter, "a," for both the transmitter and receiver must be identical in value.)

Figure 4:
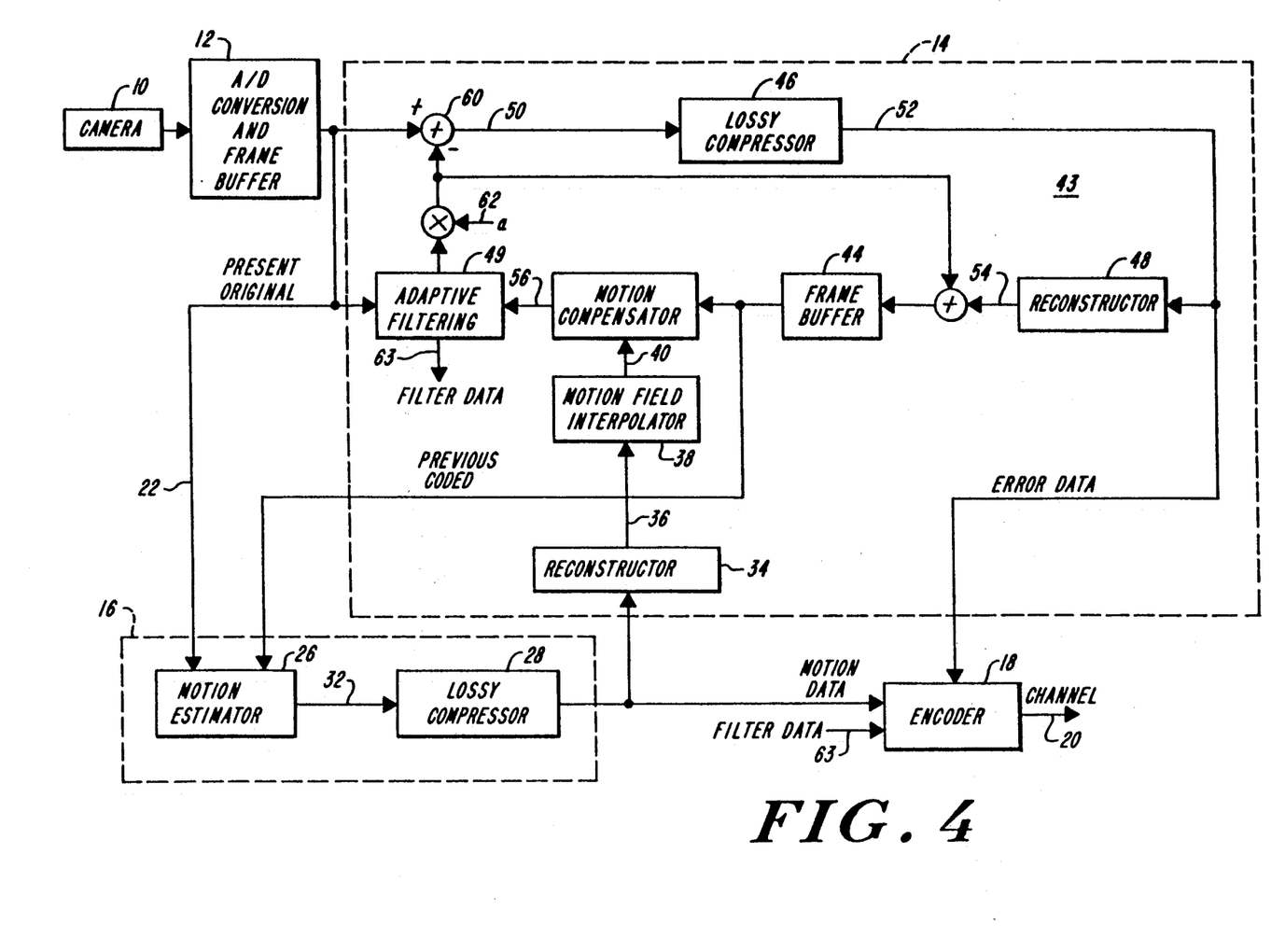
FIG. 4 is an electrical block diagram of an alternate transmitter utilizing adaptive filtering in a closed loop motion-compensated image coding system in accordance with the invention.

Referring to FIG. 4, in an alternative embodiment of the invention, the motion estimation circuitry 26 can receive an input image corresponding to the previous frame, not from the frame buffer 24 which provides an open loop circuitry, but from the frame buffer 44 to provide closed loop operation. In certain aspects of operation, such closed loop operation is effective for reducing overall error. This, however, is not always true. The alternate input to the motion estimation circuitry 26 is, in the FIG. 4 embodiment the predicted reconstructed, previous frame output at the receiver.

Figure 5:
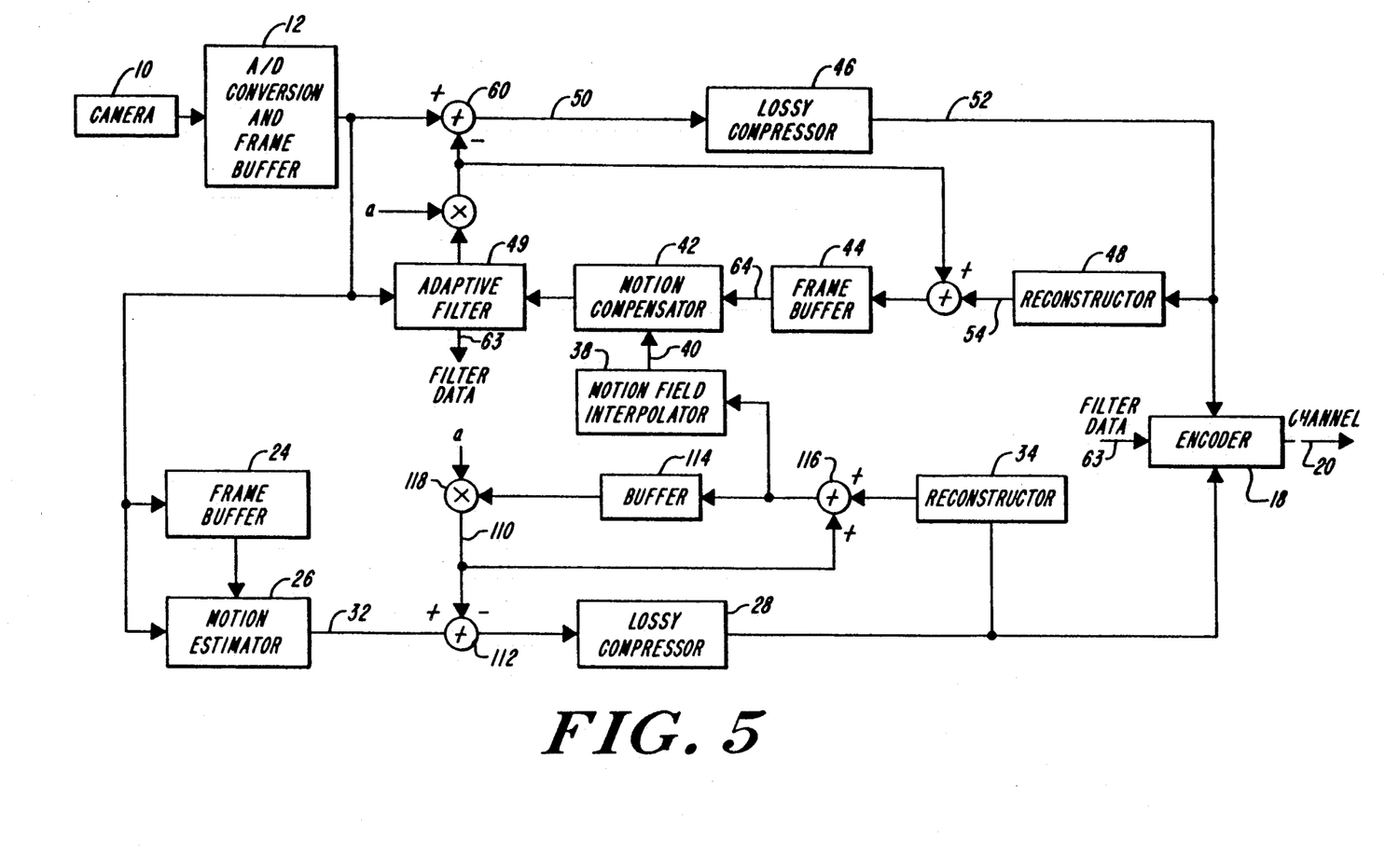
FIG. 5 is an electrical block diagram of the transmitter of a motion-compensated image coding system employing adaptive filtering which utilizes temporal DPCM coding of the motion data in accordance with the invention.

Referring now to FIG. 5, the transmitter can employ a temporal differential pulse code modulation of the output of the motion estimator circuitry 26. In this illustrated embodiment, the lossy compressor input is no longer received directly from the motion estimator circuitry 26 as in the FIG. 2 embodiment, but instead is a differential signal corresponding to the difference between the estimated reconstructed signal for the previous frame, available over lines 110, and the present motion displacement vector signal over lines 32. These two signals are differenced at an adder 112 and that difference is passed to the lossy compressor circuitry 28, operating as described in connection with FIG. 2. The output of the reconstruction circuitry 34 is modified, in this illustrated embodiment, by the previous output of the reconstruction circuitry as is available from a buffer circuitry 114. These two signals are added at 116. The output from adder circuitry 116 is a coded motion signal representation corresponding to that available in the illustrated FIG. 2 embodiment over lines 36. The loop can compensate for channel error using the multiplication circuitry 118 having a "leak" parameter, a, which can range between 0 and 1.

Figure 6:
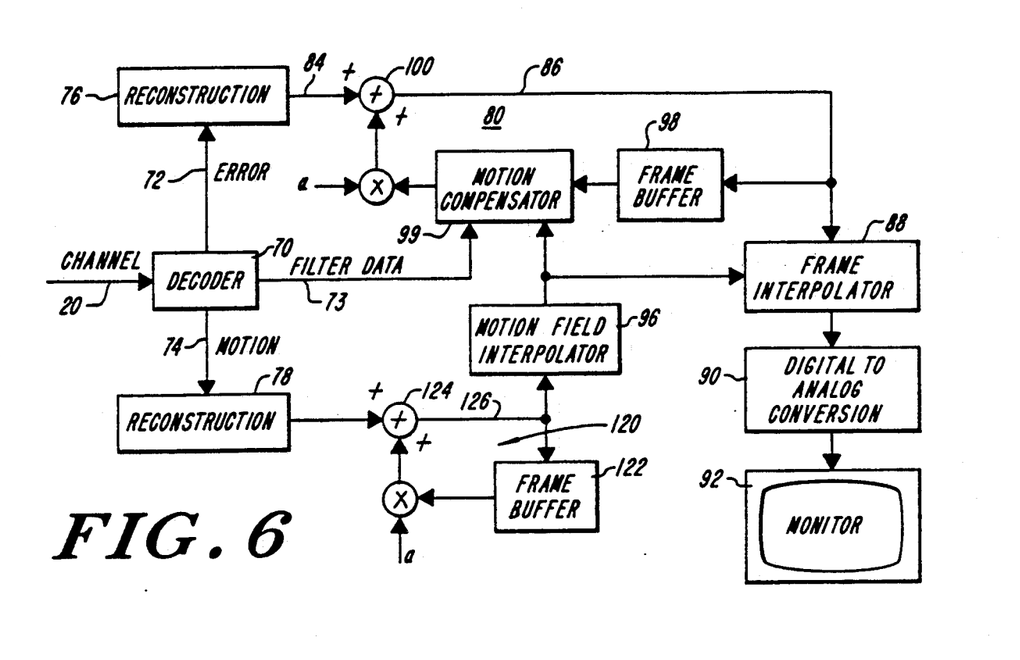
FIG. 6 is an electrical block diagram of the receiver of a motion-compensated coding system employing adaptive coding and utilizing temporal DPCM coding of the motion data in accordance with the invention.

Referring to FIG. 6, the receiver structure for the transmitter of FIG. 5 employs a differential loop 120 having a frame buffer 122 for storage of the reconstructed motion displacement vector signals from reconstruction apparatus 78. The receiver, thus, adds, using an adder 124, to the output of the reconstruction circuitry 78, the previous motion displacement vector which is stored in buffer 122. The result, over lines 126, is directed to the motion field interpolator 96. As before, a "leak" parameter, "a," can be employed to remove, over time, channel errors in the reconstruction signal.

The Motion Field Interpolator (38, 96)

Figure 7:
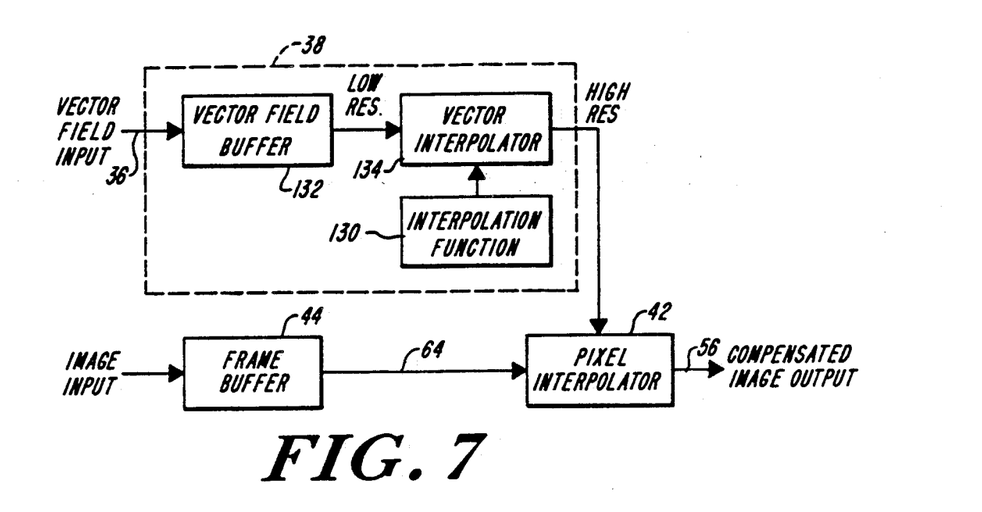
FIG. 7 is an electrical block diagram of a motion-compensation apparatus for a field of undersampled motion vectors.

Referring to FIG. 7, the motion field interpolator 38 receives from the reconstruction circuitry 34, a motion displacement vector over lines 36 for each block region of the image. For example, for a color television video signal, a typical luminance image can have a block size of 8×8 pixels while a typical chrominance image can have a block size of 4×4 pixels. The motion field interpolator, employing a selected interpolation method, then associates with each pixel of the frame, an interpolated motion vector displacement value.

In accordance with the preferred aspect of the invention, a raised cosine interpolation function is employed for associating with each pixel a displacement value. The interpolation function is stored at 130. The input vector field is stored in a buffer 132 and has a low resolution corresponding to the block size.

Figure 8:
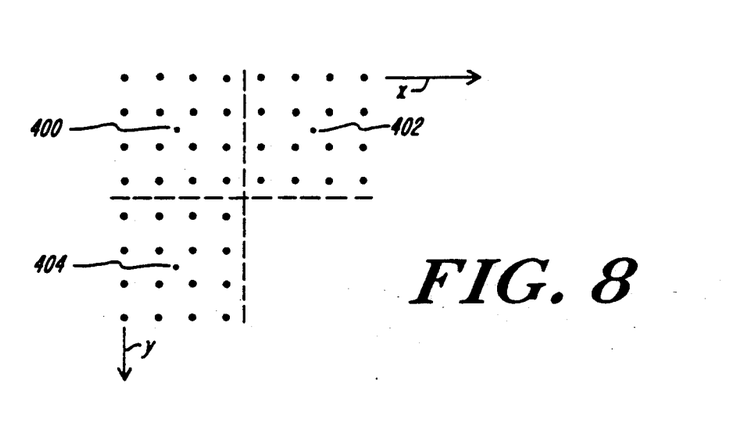
FIG. 8 is a diagrammatic representation of the spatial interpolation process.

Thus, in accordance with this aspect of the invention, each displacement vector from reconstruction circuitry 34 is associated with the center of a multi-pixel region. Thus, for a 4×4 block region, referring to FIG. 8, the interpolation vectors are associated with a center position, that is, positions 400, 402, 404 which are not, for a 4×4 block, associated with any one picture element. The interpolation process, performed by a vector interpolator 124 operates in both the X and Y directions. Thus, the displacement vector associated with the 4×4 pixel block region centered at 400 and the corresponding displacement vector associated with the region centered at 402, for example, can be interpolated with respect to the X direction, while the displacement vectors at regions centered at 400 and at 404 can be employed with respect to a Y interpolation. In general, the interpolation process employs a plurality of displacement vectors surrounding a point of interest for deriving the value of the displacement vector at the point. Thus, an X and Y interpolated displacement vector value is assigned by the vector interpolator 134 in accordance with the interpolation function being used for each pixel of the image. In other embodiments of the invention, interpolation functions other than the raised cosine can be employed. For example, a linear interpolation function, or a trapezoidal shaped interpolation function can be employed, the latter for reducing the computational load.

The output of the transmitter motion field interpolator 38, or the receiver motion field interpolator 96 (which operates in a manner identical to that of interpolator 38,) is directed to the full motion compensation circuitry 42 in the transmitter and to the full motion compensation circuitry 80 and frame interpolation circuitry 88 in the receiver. The full motion compensation circuits 42 and 80, using incoming frame image data from frame buffers 44 and 98 respectively and the motion field interpolator output data, produce, in the transmitter, the estimated receiver image over lines 56, and in the receiver, the received estimated image over lines 82. The motion compensation circuitry maps each output pixel location to a location in the previous frame as indicated by the displacement vector value associated with that output pixel location. The displacement vectors are specified by the motion field interpolation circuitry associated therewith. In particular, referring to FIG. 7, this is the output of vector interpolator 134.

There results, however, for some coordinate locations of the new image field, a mapping from pixel coordinates in the previous frame which do not fall upon a grid location. That is, the interpolated motion displacement vector may call for a movement of, for example, 1¼ picture elements. In these instances, the motion compensation apparatus employs a spatial (or pixel) interpolation, for example a linear spatial interpolation of the 2×2 block of pixels surrounding the noninteger location, for determining a pixel value from the previous frame. Other interpolation functions could, of course, be employed, for example, the value selected for the noninteger coordinate of the previous frame can be the value of the pixel closest thereto. Alternately, a raised cosine interpolation function can be employed.

In the illustrated embodiment of the invention, the receiver also employs the output of motion field interpolator to create one or more frames between those which are actually transmitted. In accordance with this aspect of the invention, the temporal frame interpolator 88, in the illustrated embodiment, receives the values of the motion field interpolation circuitry to determine the image values for a frame positioned in time, in the particular illustrated embodiment, one-half the distance between the transmitted and received frames. In the illustrated embodiment, this function is performed by halving the output displacement vectors from the motion field interpolator 96. Thus, if a picture element, from one transmitted frame to the next, were displaced two pixel positions in the X direction and 4 pixel positions in the Y direction, the temporal frame interpolator would provide an intermediate frame wherein that picture element was displaced one position in the X direction and two positions in the Y direction. In this manner, a frame half way between two received frames can be added to the picture image sequence to provide a better visual rendition.

The motion field interpolator 38 and motion compensator 42 can be implemented in hardware, in software, or in a combination of hardware and software. Attached hereto as Appendix B is a software implementation of a color video signal processing apparatus wherein the luminance ($8 \times 8$ block regions) and chrominance ($4 \times 4$ block regions) signals are processed.

The Lossy Compressor

In accordance with a preferred embodiment of the invention, the lossy compression circuitry 28 can be any of a plurality of circuitries. For example, the lossy compression circuitry can use transform coding, differential pulse code modulation, or any other lossy coding method. The output of the motion estimation circuitry 26 has the appearance, in essence, of a highly correlated image wherein each picture element represents not a portion of a visual image but, rather, a displacement value. According to the preferred embodiment of the invention, a block transform encoding method is employed for coding the motion estimation output signal.

In the illustrated embodiment of the invention, the lossy compression circuitry can be a discrete cosine transform operating on the displacement vector output of the motion estimation circuitry 26 to provide coefficient data which is then adaptively subjected to a threshold and uniform quantization process. In this circumstance, the reconstruction circuitry 34 then becomes the inverse discrete cosine transform as is well known in the art.

In other embodiments of the invention, the lossy compression circuitry 28 can be embedded in a differential pulse code modulation circuitry, for example that described in connection with FIG. 4. In this instance, the temporal differential pulse code system employs a pulse code modulation coder of limited bit structure, and it is this lossy coder which provides the errors which are compensated for by the system as described hereinabove.

In yet another aspect of the invention, and as described the above-noted co-pending application U.S. Ser. No. 740,806, filed in the name of Henrique Malvar, on June 3, 1985, and assigned to the assignee of this invention, preprocessing techniques can be employed for improving even more upon the transform method described hereinabove, to substantially eliminate the block coding artifacts. In still another embodiment of the invention, the lossy compressor can be implemented using a short-space Fourier transform, such as that described in U.S. application Ser. No. 713,478, filed on Mar. 19, 1985, for a Method and Apparatus for Multi-Dimensional Signal Processing Using a Short-Space Fourier Transform, and assigned to the assignee of the present invention. The disclosure and specification of the above identified United States patent applications are incorporated herein by reference.

The Motion Estimator

Figure 9:
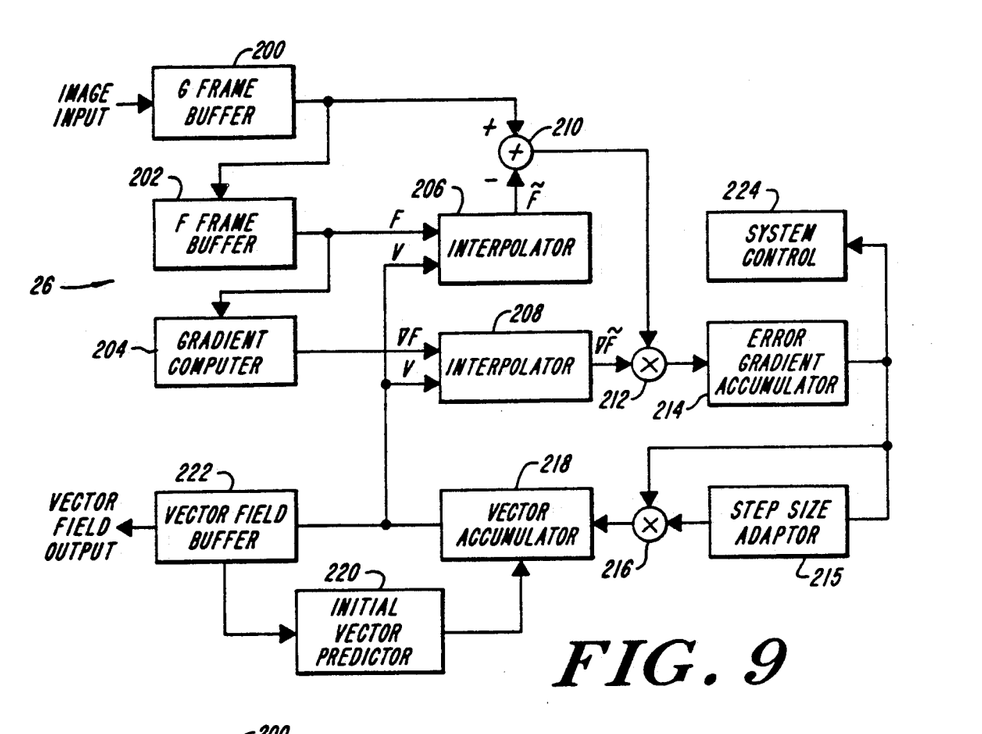
FIG. 9 is an electrical block diagram of an iterative spatial-domain motion estimation apparatus utilizing adaptive, steepest descent error minimization.

Referring now to FIG. 9, in accordance with the illustrated embodiment, the motion estimation circuitry 26 employs an iterative spatial domain approach which quickly converges through an error minimization process for determining the displacement vectors of an input signal. In the preferred embodiment, an adaptive, steepest descent approach method is employed. The method has good convergence behavior.

In Hinman, B., "Theory and Application of Image Motion Estimation," Master's Thesis, M.I.T. (1984), equation 3.12 describes the iterations for determining a displacement vector v for a pixel having a location p in an image f. The new image is represented by g. That equation is reproduced herein as Equation 1 where the "i" represents an earlier value of the displacement vector and "i+1" represents a next value of the displacement vector.

$$V^{i+1} = V^i - 2e \sum_{p} [g(p) - f(p - v^i)] (\cdot) f(p - v^i) \qquad \text{(Equation 1)}$$

Equation 1 can be implemented in accordance with FIG. 9 where the input g and f frames are stored in buffers 200 and 202 respectively. The gradient value of the frame is determined by a gradient computer 204 and spatial interpolators 206, 208 provide the values of f required by the summation in Equation 1. A summing element 210 and a multiplication element 212 yield the error gradient value which is accumulated in an accumulator 214. The output of the accumulator 214 is multiplied by a step size adaptor 215 at a multiplier 216; and the result is used to update the vector displacement value in an accumulator 218. The accumulator receives the initial vector prediction value from a prediction hardware 220.

The updated vectors are employed by interpolators 206 and 208 in determining the values of "f" and the vector output field is stored in a buffer 222. The entire apparatus operates under the control of a system controller 224 which monitors the value of the error gradient accumulator output and in response thereto adaptively changes the step size.

Figure 10:
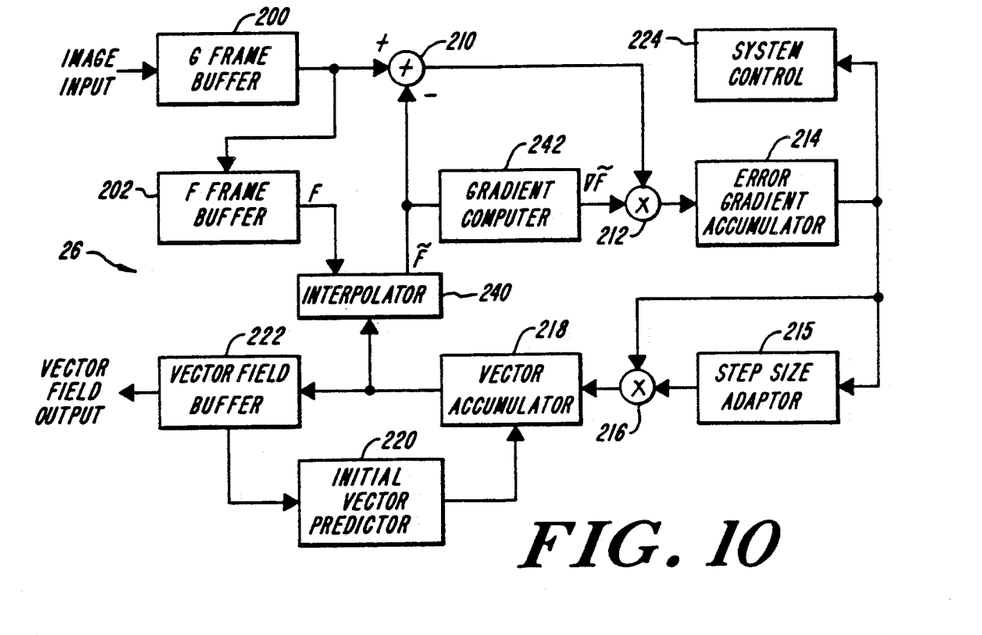
FIG. 10 is an electrical block diagram of an iterative spatial-domain motion estimation apparatus utilizing adaptive, steepest descent error minimization with an improved data processing structure.

Referring now to FIG. 10, an improved method for implementing the adaptive steepest descent error minimization iterative spatial-domain motion estimator 26, defined by equation 1, provides for use of a single interpolator 240 operating upon the f frame and a gradient computation circuitry then operating upon the interpolated value output of interpolator 240. There results from this circuitry the elimination of one of the FIG. 9 interpolators thus providing a savings of hardware and/or software.

In employing this method, the three important parameters are the initial step size, e, the stopping or cutoff threshold, T, and the predictor set, $a_k$. The initial step size plays an important role in determining the rate at which the method converges upon the motion vector displacement. When e is chosen to have a very small value, the method requires an excessive number of iterations before reaching a sufficiently small neighborhood of the minimum. As the value of e increases, the rate of convergence also increases but there comes a value when e is so large that the search procedure will oscillate about the minimum without converging. The value of e must be determined by empirical tests. For a block size of 4×4, a value of $3 \times 10^{-5}$ has been found to provide the best convergence behavior.

The cut-off threshold is compared to the magnitude of the error gradient times the initial step size, e, for each iteration. This threshold must be chosen with two constraints in mind. First, it should be sufficiently small so that a displacement close to the actual displacement is reached. The second and opposing constraint is that as the threshold decreases, the number of required iterations increases dramatically. Thus, as with the step size, the appropriate cut-off threshold must be found empirically. (When the step size varies, as described below, the threshold, T, as defined above continues to be compared against the multiplicative product of the initial step size, e, and the error gradient.)

In determining the cutoff threshold empirically, two indicators are of interest. They are the average number of iterations per block and the motion compensated frame difference energy. In order to find the best value of T, the estimation and compensation process is run several times. Starting with a small cut-off threshold, a minimal value of the motion compensated frame difference energy is determined. As the threshold is increased, the average number of iterations steadily drops while the motion compensated frame difference energy remains essentially constant. Eventually, however, a value of the threshold is reached at which the estimated displacements become inaccurate and the motion compensated frame difference energy begins to rise. In seeking the point of inflection in the motion compensated frame difference energy as a function of T, a value of $7 \times 10^{-3}$ was found to be most appropriate. This threshold corresponds to a minimum vector update of $7 \times 10^{-3}$ pixels.

The selection of the predictor coefficients affects both the average number of iterations and the motion compensation frame difference energy.

Figure 11:
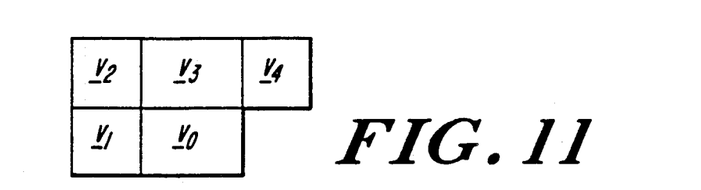
FIG. 11 is a diagrammatic presentation of the relative locations of adjacent blocks used in predicting an initial displacement motion vector value.

The selection of the initial value of the displacement vector for each block is, in the illustrated embodiment, chosen as a linear combination of displacement vectors adjacent thereto. Thus, referring to FIG. 11, the steepest descent method provides access to the displacement vectors above and to the left of a present displacement vector $V_o$. Thus, in accordance with the illustrated embodiment, the present displacement vector is defined by equation 2 as:

$$V_o = \sum_{j=1}^{4} a_j V_j \qquad \text{(Equation 2)}$$

The $a_j$ are the predictor coefficients while the $V_j$ are the previously determined displacement vectors.

The preferred vector predictors, $a_j$, are $a_1 = 0.3$, $a_2 = 0$; $a_3 = 0.4$ and $a_4 = 0.3$. For these values of the vector predictors, in combination with the step value and threshold values noted above, for one set of data, the average number of iterations was 6.71, and the motion compensation frame difference energy was 14.1 dB's lower than the non-motion compensated frame difference energy.

In accordance with a preferred embodiment of the invention, the selected value of e, the initial step size can be adapted to change as a function of the error gradient. Thus, according to this illustrated embodiment of the invention, and under the control of the system controller 224, the step size value is adapted to change, depending upon the present gradient error value, or the present and one or more previous error gradient values, so that the step size for the vector displacement does not become unreasonably small. A description of two methods for selecting step size is provided in the Hinman thesis beginning at page 33.

According to the preferred embodiment of the invention, the second method, defined by Equations 3.18, 3.19, and 3.20 of the Hinman thesis is modified to reduce the processing load of the system. In this embodiment, the equations 3.18, 3.19, and 3.20 are modified so that:

$$\text{(new step size)} = \text{(old step size)} \cdot \qquad \text{(Equation 3)}$$

where $$= \begin{cases} 1.4 \text{ if } R\ 0 \\ 0.3 \text{ if } R\ 0 \end{cases} \qquad \text{(Equation 4)}$$

and $$R = [\text{Gradient } E(V_x^i)] \cdot [\text{Sign } [\text{Gradient } E(V_x^{i-1})]] +$$
$$[\text{Gradient } E(V_y^i)] \cdot [\text{Sign } [\text{Gradient } E(V_y^{i-1})]]$$

and "Gradient E" represents the gradient of the present x or y error function, and "Sign $[\times]$" equals $\pm 1$ depending upon the sign of the argument. Equation 4, thus defined, provides a third method for an adaptive steepest descent approach. As noted above, however, the cutoff threshold value, T, is measured against the initial step size. Thus, the illustrated T can be defined as the product of a constant times the error gradient.

Further, in accordance with the preferred embodiment of the invention, the system controller 224 also prevents the displacement increment step size from being greater than a selected threshold, for example, greater than one pixel, and further prevents the maximum value of the displacement vector from being greater than a second selected threshold, for example greater than $7\frac{1}{2}$ pixels. In this manner, more control of the steepest descent process is available and singularities which prevent convergence can be avoided.

The illustrated motion estimator can be implemented in hardware, in software, or in a combination thereof. In one particular embodiment, attached hereto as Appendix C, a software implementation of an adaptive steepest descent method and apparatus is provided.

Adaptive Filter (49)

As noted above, the output of the motion compensator 42 represents the receiver motion compensated image as a result of applying the coded motion signal representation from the lossy compressor 28 to the previous frame which is stored in frame buffer 44. The receiver motion compensated image, under certain circumstances, can be improved in various spatial regions (blocks) by selectively applying a spatial low-pass filter. To decide whether the filtering process should be performed on a block of the receiver motion compensated image, a comparison of the squared prediction error between the original image and the unfiltered and filtered prediction is performed on a block-by-block basis.

A block, in this illustrated embodiment, is designated as an 8×8 grouping of picture elements. For each block, the prediction having the least error energy (weighted, for example, by a constant to provide a bias in favor of unfiltered prediction) is selected, and that decision information, the filter data available over line 63, is made available to the encoder 18. The filter data is sent to the receiver to enable it to perform the same operation as the transmitter on each corresponding block during the receiver image reconstruction process. After the adaptive low-pass filtering decision has been made for a block, the resulting block image, whether or not filtered, is subtracted as noted above from the new uncoded image to generate an error image over lines 50.

Figure 12:
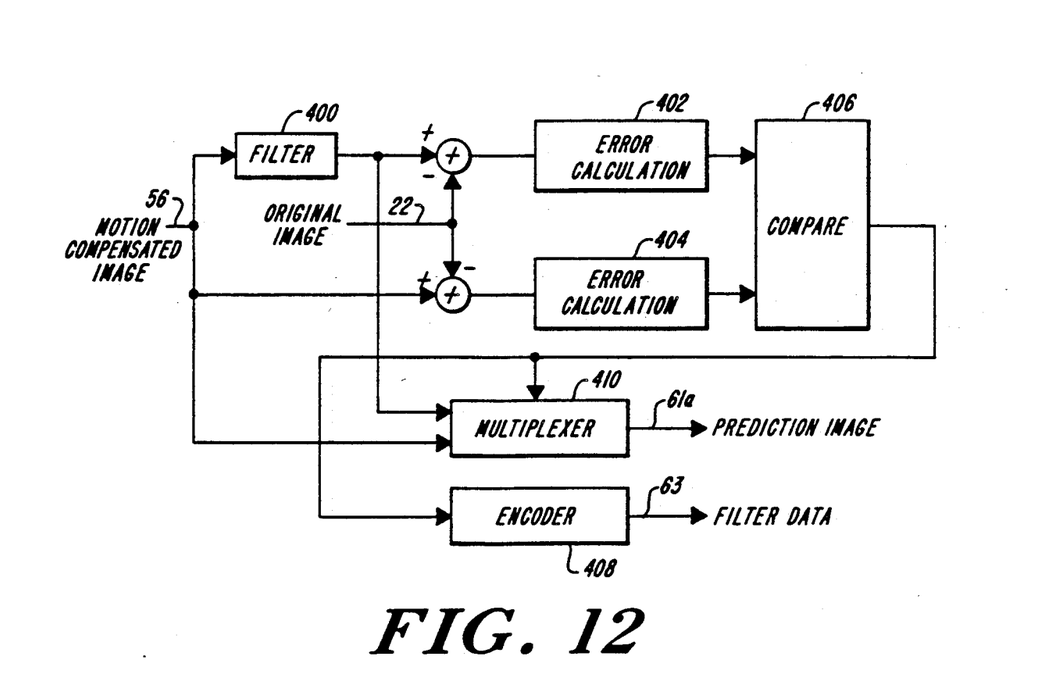
FIG. 12 is a block diagram of an adaptive filter according to the illustrated embodiment of the invention.

Referring to FIG. 12, the adaptive filter has four stages of operation. First, the motion compensated image block on line 32 is low-pass filtered by a filter element 400. Second, an energy measurement is made at energy measurement circuitries 402 and 404 for, respectively, both the filtered and unfiltered versions of the block in comparison to the original image. Third, a decision is made at a comparator 406 to determine if the low-pass filtered block should be inserted in place of the unfiltered receiver motion compensated image. Finally, the information describing the filter usage for each block is encoded by an encoder 408 to provide the filter data on lines 63 which is sent to the encoder 18. The output of the comparator 406 controls a multiplexor 410 to provide the prediction image output over lines 61a.

The filtering operation is performed, in accordance with the present invention, over composite blocks of the receiver motion compensated image having a size of sixteen picture elements by sixteen picture elements. The low-pass filter, in accordance with the illustrated embodiment of the invention, provides for a simple $5 \times 5$ block averaging. The averaging process is performed, in accordance with this embodiment of the invention, as a length five moving average on all of the rows followed by a length five moving average of all of the columns.

Each $16 \times 16$ composite block at an edge of the image is enlarged by adding two rows above or below and/or two columns to the right or to the left of the existing block in order to provide the data needed for the $5 \times 5$ average. The result is thus generated for each of the sixteen pixels in the row by averaging the current pixel value with the value of the two pixels to the left and the two pixels to the right. For the first pixel in each row, the averaging is done explicitly in accordance with the illustrated embodiment of the invention; however, for the remaining pixels of the row, the average can be determined by successively adding the next pixel to the right and subtracting the next pixel to the left of the length five region. The resulting values are stored in a separate $16 \times 16$ array. After filtering of all rows, the same averaging procedure is performed on all of the sixteen columns and the results are stored in a separate $16 \times 16$ array. For those composite blocks at the edge of a frame, the two extra rows or columns are obtained by repeating the row or column at the edge of the composite block.

Once the filtered version of the reference block has been generated, the error energy is determined for both the predicted receiver motion compensated block and the filtered motion compensated block. The energies are determined for each of the $8 \times 8$ blocks in the overall $16 \times 16$ composite block. The energy values, in accordance with the illustrated embodiment of the invention, are determined by a sum of squares operation for every picture element of the block. The comparison is made to the original image which is available to the adaptive filter from the analog-to-digital conversion and frame buffer 12, over lines 22.

The two energy measurements that result for each of the $8 \times 8$ blocks are compared to determine whether the filtered block should be used as a replacement for the unfiltered block in the motion compensated frame. The energies are compared to each other using a constant weighting multiplier. After the weighting, the block having the smaller energy value is selected. If the unfiltered error energy is lower, the $8 \times 8$ block from the motion compensator 42 remains unchanged and is directed to the leak multiplication circuitry and thence to adder 60. If the filter error energy is lower, then the original $8 \times 8$ block is replaced by the corresponding $8 \times 8$ filtered block from the adaptive filtering process.

For each $16 \times 16$ composite block, the result of the comparisons are stored in a list and a four bit code is generated which indicates which of the four blocks is to be filtered and which is not.

In accordance with the preferred embodiment of the invention, the four bit codes that describe the filter data for each $16 \times 16$ composite block are coded using a variable length code. The variable length coding procedure takes advantage of the fact that filtered blocks tend to appear in clusters.

At the receiver, the variable length filter data is decoded and the data, referring to FIG. 3, is directed to the motion compensator 99. In this embodiment, the motion compensator includes circuitry for determining when filtering is to be applied to its input data. If filtering is employed, indicated by a nonzero decoded code word, then the $16 \times 16$ composite block is low-pass filtered in accordance with the code word and the appropriate $8 \times 8$ blocks available at the input of the motion compensator 99 are replaced by their corresponding filtered block versions.

In accordance with the illustrated embodiment of the invention, the preferred weighting constant is equal to one. Thus, the error associated with the filtered output must be smaller than the error associated with the unfiltered output before a filtered block will be substituted for that unfiltered block.

The adaptive filter method and apparatus can be implemented in hardware, in software, or in a combination of the two. Attached hereto as Appendix A is a software implementation of the method.

Additions, subtractions, deletions, and other modifications of the preferred particular embodiments of the invention will be apparent to those skilled in the art and are within the scope of the following claims.

What is claimed is:

1. A method for decoding and receiving an encoded sequence of image frames comprising the steps of
   receiving, from a communications path, filter selection data for determining a data source for reconstructing a next block of an image frame at the receiver, and
   selecting, in an uncoded mode of operation, a low-pass image derived from a previously received image frame, and in a second coded mode of operation, image data from said communications path for reconstructing, from the image data, a block of the image frame.

2. A method for decoding and receiving an encoded sequence of image frames comprising the steps of
   receiving, from a communications path, filter selection data for determining a data source for reconstructing a next block of an image frame at the receiver, selecting, in an uncoded mode of operation, a low-pass image derived from a previously received image frame, and in a second coded mode of operation, image data from said communication path for reconstructing, from the image data, a block of the image frame, and applying a block averaging filter process at each picture element of the block of the image frame to be generated in said first uncoded mode of operation.

3. A method for decoding and receiving an encoded sequence of image frames comprising the steps of receiving filter selection data over a communications channel for determining for a block of the image frame being received whether to employ low-pass filtering in said block of the image in generating a prediction image from a previous receiver image, said filter selection data being generated by an image encoding transmitter, and generating each block of the image frame using the block, chosen in accordance with the said filter selection data, selected from a block of a previous receiver image, and a low-pass filter representation of a block of said previous image.

4. An apparatus for decoding and receiving a sequence of image frames comprising means for receiving filter selection data over a communications channel for determining, for a block of the image frame being received, whether to employ low-pass filtering in said block of the image in generating a prediction image in a motion compensated receiver image, and means for generating said motion compensated image using, in a first mode, said low-pass filtering and, in a second mode, a block of a previous receiver image frame using data measuring a motion displacement.

5. The apparatus of claim 4 wherein said image generating means comprises means for applying a block averaging filter process at each selected picture element of a block of the image frame.

6. In an image transmission and receiving process for communicating a sequence of image frames, wherein the image is divided into a plurality of block regions and the data transmission generates, selectively, high spatial frequency block displacement information relating to the image and filter selection data, a decoding method for comprising the step of determining from filter prediction data for each block of an image frame being received from a communications channel whether in a first operating mode, a low pass filter image frame of a block of a previously received image is to be employed for generating the predicted image representation for a block region of the image being received, or, in a second operating mode, further following high spatial frequency block displacement information content of the image shall be employed for generating the predicted image representation for the block region.

7. In an apparatus for decoding and receiving a sequence of image frames having means for dividing the image into a plurality of block regions, means for generating a data coding of the high spatial frequency information content of the image, and means for determining for each block region an error value for each of a filtered image prediction of the block represented by the data coding and an image prediction using the data coding without filtering, a receiving apparatus comprising means for receiving a filter selection data over a communications channel for operating, in a first mode, for reconstructing said block region of the image employing a low-pass filtered version of a previously received image for said block and, in a second mode, employing the high spatial frequency information content of the image data being received from the communications path.

* * * * *